UNITED STATES PATENT OFFICE.

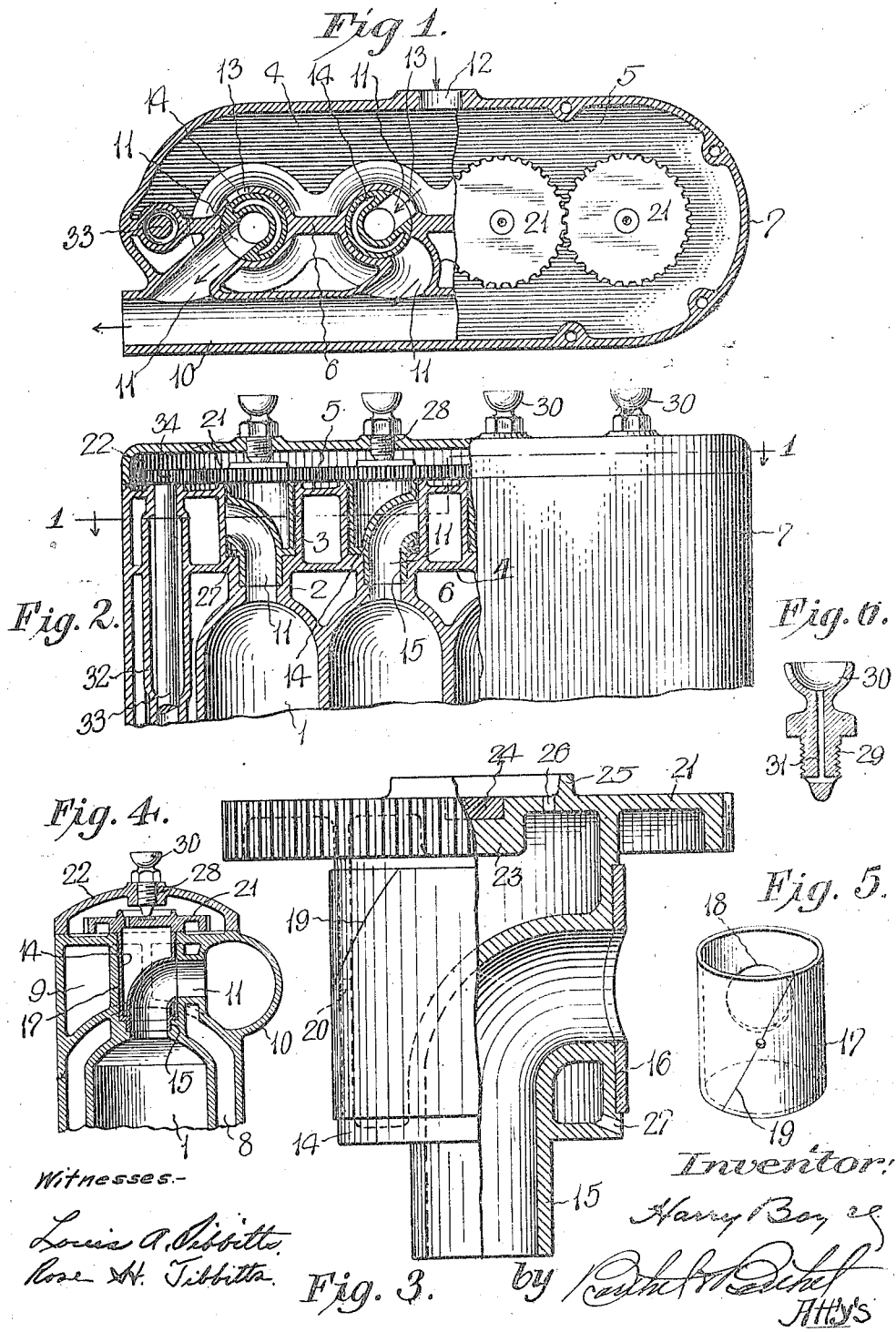

HARRY BOYCE, OF DETROIT, MICHIGAN.

VALVE CONSTRUCTION.

1,208,468.

Specification of Letters Patent.  Patented Dec. 12, 1916.

Application filed January 28, 1916. Serial No. 74,824.

*To all whom it may concern:*

Be it known that I, HARRY BOYCE, a citizen of the United States of America, residing at Detroit, in the county of Wayne and State of Michigan, have invented certain new and useful Improvements in Valve Construction, of which the following is a specification, reference being had therein to the accompanying drawings.
This invention relates to valve constructions for internal combustion engines, and my invention aims to furnish a multi-cylinder internal combustion engine with novel rotary intake and exhaust valves which obviate a multiplicity of ports, permit of proper lubrication, and assure compactness, ease of operation, and proper cooling of those parts subjected to heat from the cylinders of the engine.
My invention further aims to provide an internal combustion engine having cylinders *en bloc* with integral valve housings and horizontal partitions coöperating with an engine casing in forming an intake chamber and an exhaust manifold, the disposal of said chamber and said manifold being such that vertically disposed rotary valves, each having a common intake and exhaust port, can be advantageously used and driven in synchronism and in timed relation to the usual operation of a multi-cylinder engine.

My invention further aims to provide a novel system of lubrication and packing for an engine in accordance with this invention, and in the general make-up of the engine, the parts are constructed with a view of reducing the cost of manufacture and at the same time insure safety, durability and ease of assembling. With these and other ends in view the invention resides in the novel construction, combination and arrangement of parts to be hereinafter specifically described and then claimed.

Reference will now be had to the drawing, wherein—

Figure 1 is a horizontal sectional view of the internal combustion engine, showing a gear chamber and an intake chamber; Fig. 2 is a side elevation of a portion of the engine, partly broken away and partly in vertical section, showing the line I—I on which the Fig. 1 view is taken; Fig. 3 is an enlarged elevation of a detached rotary valve, partly broken away and partly in section;
Fig. 4 is a vertical cross sectional view of a portion of the engine; Fig. 5 is a perspective view of a detached packing ring; Fig. 6 is a vertical sectional view of detached combined cup and bearing.

In the drawing, 1 denotes a plurality of cylinders cast *en bloc* with the upper ends thereof provided with necks 2 and cylindrical valve housings 3, said necks establishing communication between the cylinders and the housings. The cylinders 1, at the upper ends thereof, support a horizontal partition or wall 4 and the valve housings 3 are connected by a horizontal partition or wall 5 and this wall is connected to the upper end of the cylinders by a longitudinal vertically disposed dividing wall 6. The walls 4, 5 and 6 are connected to an engine casing 7 and said casing coöperates with said wall in providing a water jacket 8 for the cylinders 1 and an intake chamber 9 at one side of the engine. At the opposite side of the engine the casing 7 is formed with an exhaust manifold 10 having angularly disposed and curved branches 11 in communication with valve housings 3 of the cylinders 1. By comparing Figs. 1 and 4, it will be observed that the wall 4 simply forms the bottom of the intake chamber 9, and on the exhaust side of the engine, the jacket 8 extends around branches of the manifold 10.
The casing 7 is provided with an intake port 12 communicating with the chamber 9 and this chamber communicates with the housings 3 through intake ports 13 provided therefor in said housings.
Rotatable in each valve housing 3 is a rotary hollow vertically disposed valve 14 formed with an elbow 15, one end of which opens axially of the rotary valve and protrudes from below the end thereof to extend into the neck 2 of the cylinder while the opposite end of the elbow opens in an annular packing seat 16 in the periphery of the valve. The seat 16 accommodates a resilient packing ring 17 approximately the depth of the valve 14, and such packing ring has an opening 18 in communication with the elbow 15. The packing ring 17 has a diagonally disposed split 19 which permits of the packing ring being easily placed upon the seat 16 and said ring is prevented from circumferentially shifting on the valve by a pin 20 mounted in the valve and intersecting the split of the packing ring 17.
The upper end of each hollow rotary valve is formed with a horizontally disposed gear wheel 21 and the gear wheels of said rotary valves are adapted to mesh within a gear chamber 22 formed by the wall 5 and the engine casing 7. Each gear has a central depressed hub portion 23 provided with a countersunk bearing block 24 and surrounding said bearing block is an annular upstanding flange forming a basin 25 on top of each gear. The bottom of the basin 25 has a port 26 communicating with the interior of the rotary valve, and the side wall of said valve at the bottom thereof, has an outlet port 27 whereby lubricant may enter the valve housings 3 and the necks 2 and insure a non-frictional rotation of the rotary valves in the housings 3 when motion is imparted to the train of gears 21. The top of the casing 7 is formed with openings 28 for detachable bearings 29, adapted to engage the bearing blocks 24 and coöperate with the housings 3 in properly positioning the rotary valves 14 to maintain the gears 21 thereof in mesh. The bearings 29 as best shown in Figs. 2 and 6, are formed with cups 30 and distributing ports 31, said ports permitting of a lubricant flowing from the cups 30 into the basins 25, where the bearing blocks 24 will be thoroughly lubricated and by centrifugal force the lubricant carried to the ports 26 to enter the rotary valves and eventually reach the housings 3 thereof.

The engine casing 7, at one end thereof, is formed with a shaft housing 32 for a vertically disposed driven shaft 33 which extends into the gear compartment 22, and has the end thereof provided with a small gear 34 for imparting movement to the train of gears 21. The shaft 33 is adapted to be driven at a proper speed by the crank shaft or a counter shaft of the engine in order that the train of gears 21 will revolve the rotary valves 14 and permit of the cylinders 1 exhausting and receiving an explosive mixture from the intake chamber 9 of the engine.

The elbow 15 of a rotary valve serves as an intake port and as an exhaust port for a cylinder, and by reference to Fig. 1 it will be observed that during the rotation of the valve the elbow communicates with a branch 11 of the exhaust manifold 10 to exhaust the cylinder and then communicates with an intake port 14 to charge the cylinder. The rotary valves can be easily and accurately positioned in the valve housings 3 to coöperate in properly exhausting and charging the cylinders of the engine, and by using rotary valves of the construction herein defined, the trouble and disadvantages heretofore experienced in connection with the usual type of puppet valve are eliminated, and a more compact engine structure obtained which can be advantageously used in connection with automobiles.

The lubricant conveying bearings 29 assure easy rotation of the train of gears within the gear chamber, and at the same time the lubricant entering the housings 3 coöperates with the packing rings 17 in assuring equally balanced non-leakable valvular members for controlling the intake and exhaust of the cylinders of the engine.

It will be noted that the cylinders 1, the walls 4, 5 and 6, and the casing 7 have been shown as integral with the exhaust manifold 10, and that the top of the casing 7 is detachable whereby easy access can be had to the train of gears and the rotary valve. While this is the preferred form of construction, it is to be understood that the structural elements are susceptible to such variations and modifications as fall within the scope of the appended claims.

What I claim is:—

1. The combination of engine cylinders, and a casing providing an intake chamber at one side of the engine, a water jacket for said cylinders, and an exhaust manifold; valve housings at the upper end of said cylinders, a vertical partition connecting said valve housing and coöperating therewith in forming a wall of the intake chamber of said casing, rotary valves in said housings adapted to establish communication between said cylinders and said exhaust manifold and said cylinders and said intake chamber, a train of gears above said housings adapted to impart movement to said rotary valves, and lubricant conveying bearings for each gear extending through the top of said casing.

2. The combination of engine cylinders having neck portions, and a casing coöperating with said cylinders in forming a water jacket, an intake chamber, a gear chamber and an exhaust manifold; valve housings at the neck portion of said cylinders in communication with said intake chamber and said exhaust manifold, rotary valves in said housings having elbows with the lower ends thereof extending into the neck portions of said cylinders and adapted to establish communication between said cylinders and said exhaust manifold and said cylinders and said intake chamber, and a train of gears in said gear chamber adapted to impart movement to said rotary valves.

3. In combination, engine cylinders, a casing having horizontal spaced walls and a partition connecting said walls and coöperating with said cylinders in providing a water jacket, an intake chamber, a gear chamber, and an exhaust manifold; valve housings forming part of said casing partition and connecting the horizontal casing walls and in communication with said cylinders, said intake chamber and said exhaust manifold; rotary valves in said valve housings having elbows adapted to establish communication between said cylinders and said exhaust manifold and said cylinders and said intake chamber, a train of gears in said chamber for imparting movement to said rotary valves, and means extending through said casing into said gear chamber adapted to impart movement to said train of gears.

4. In combination, engine cylinders, a casing having horizontal walls and a partition connecting said walls and coöperating with said cylinders in providing a water jacket, an intake chamber, a gear chamber, and an exhaust manifold; valve housings forming part of the casing partition and connecting the horizontal casing walls and in communication with said cylinders, said intake chamber and said exhaust manifold; hollow rotary valves in said valve housings adapted to establish communication between said cylinders and said intake chamber and said cylinders and said exhaust manifold, a train of gears in said gear chamber forming part of said rotary valves and adapted to impart movement thereto, means bearing centrally upon said rotary valves in said housings and adapted to convey a lubricant to said housings, and means extending into said gear chamber for imparting movement to said train of gears.

5. In an internal combustion engine, cylinders having necks, valve housings at the upper ends thereof, rotary valves in said valve housings having elbows extending into the necks of the cylinders and constituting a single exhaust and intake port for each cylinder, meshing gears forming part of said rotary valves and adapted to impart movement thereto, and lubricant conveying bearings, engaging said gears to maintain said valves in said housings and adapted for delivering a lubricant on top of each gear.

6. In an internal combustion engine, a cylinder, a vertically disposed hollow rotary valve at the upper end of said cylinder having the ends thereof closed and provided with lubricating ports, an elbow in said valves having one end connected to a side wall of said valve and the other end thereof depending from said valve and constituting a single intake and exhaust port for said cylinder, a gear wheel forming part of said rotary valve and adapted to impart movement thereto, and lubricant conveying means engaging said gear wheel to hold said valve relative to said cylinder.

7. In an internal combustion engine, an intake chamber at one side of said engine, an exhaust manifold at the opposite side thereof, vertically disposed hollow rotary valves between said intake chamber and said exhaust manifold and adapted to alternately establish communication between said intake chamber and said cylinders and said exhaust manifold and said cylinders, said valves having lubricating ports in the upper and lower ends thereof, means disposed above the intake chamber and said valves adapted to impart movement to said rotary valves, and means extending into the top of said engine and engaging said valve moving means adapted to supply lubricant to each rotary valve and the ports thereof.

In testimony whereof I affix my signature in presence of two witnesses.

HARRY BOYCE.

Witnesses:
ANNA M. DORR,
KARL H. BUTLER.